No. 670,026. Patented Mar. 19, 1901.
A. B. KITTSON.
ELECTRIC CIGAR LIGHTER.
(Application filed Oct. 24, 1900.)
(No Model.)
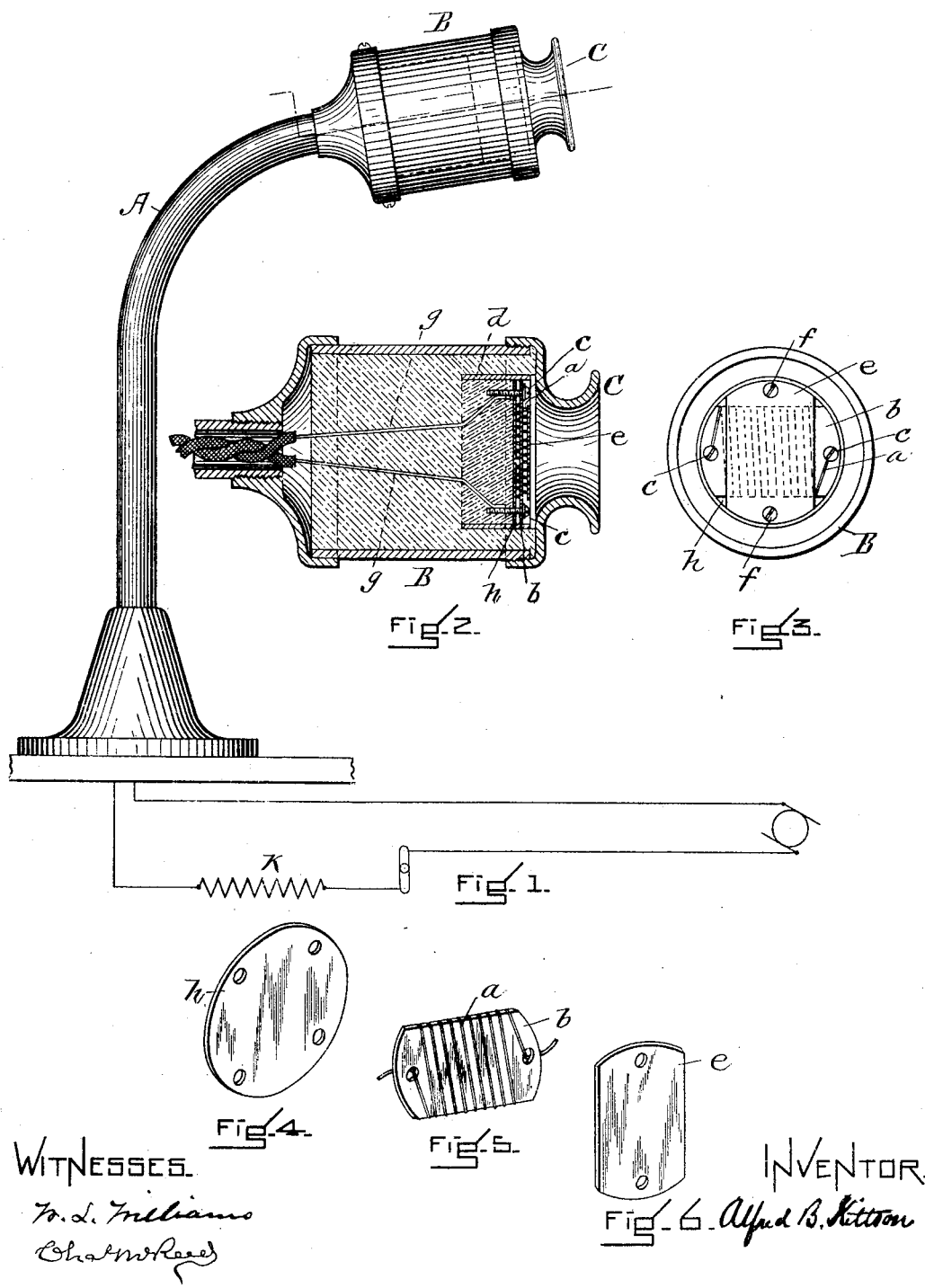
WITNESSES. INVENTOR.
Alfred B. Kittson

UNITED STATES PATENT OFFICE.

ALFRED B. KITTSON, OF BOSTON, MASSACHUSETTS.

ELECTRIC CIGAR-LIGHTER.

SPECIFICATION forming part of Letters Patent No. 670,026, dated March 19, 1901.

Application filed October 24, 1900. Serial No. 34,122. (No model.)

*To all whom it may concern:*

Be it known that I, ALFRED B. KITTSON, a citizen of the United States, residing at Boston, in the county of Suffolk and State of Massachusetts, have invented a new and useful Improvement in Electric Cigar-Lighters, of which the following is a specification.

My invention consists in a new and improved electric lamp for lighting cigars, and is intended especially for use on cigar-stands in cigar-stores, hotels, and other similar places. For the purpose of lighting cigars at such places a small alcohol-lamp or gas-jet is usually employed. Such lights are liable to be blown out by a sudden gust of wind and are otherwise objectionable. Incandescent electric wires have also been used for this purpose, the wire being usually attached to a flat surface of asbestos or mica and the cigar applied directly to the wire; but these have proved for various reasons ineffective and impractical.

My invention consists, essentially, in the employment of a flattened incandescent coil of fine platinum wire protected by a covering sheet of mica, through which the heat is transmitted to the cigar.

In the drawings accompanying this specification, Figure 1 is a side view of my invention mounted upon a stand for use. Fig. 2 is a longitudinal section of the head of the lighter. Fig. 3 is a front view of the same with the mouthpiece removed. Fig. 4 is a detail showing the mica plate at the back of the electric coil. Fig. 5 is a detail showing the electric coil wound around a mica plate. Fig. 6 is a detail showing the outer covering-plate of mica.

A is a stand, upon the upper end of which is mounted the case B, containing the lighting apparatus and provided with a mouthpiece C, through which the cigar is inserted. Within the case B, at its front end, is the ring $d$, in which is mounted the incandescent coil $a$. This coil is made of fine platinum wire, preferably of about two and one-half thousandths of an inch in diameter, wound around a thin plate of mica $b$, which separates the sides of the coil and brings the loops of the wire on each side into a plane. Instead of mica any other material which is not a conductor of electricity may be used for this purpose. In order to have as many loops of wire as possible, and thereby increase the heating-surface, the loops are brought as closely together as possible without danger of short-circuiting. With wire of the size above mentioned the loops should be about one sixty-fourth of an inch apart.

The coil is inserted in an electric circuit in the usual manner, the ends of the wire being connected by screws $c$ to the ends of the feed-wires $g$, which pass up through the standard A. The coil and the mica plate on which it is wound are mounted in a ring $d$, the back of which is filled with plaster-of-paris, which serves to keep the parts in place, to secure insulation of the wires, and to furnish a flat non-conducting surface on which the electric coil may rest. To further protect and insulate the coil, a sheet of mica $h$ is placed on the plaster and in immediate contact with the coil. Another plate of mica $e$ is placed outside of the coil and in immediate contact therewith, being fastened by screws $f$, working in nuts set in the plaster. The coil is thus placed between two plates of mica by which it is insulated and protected. When the electric circuit is complete, the coil becomes heated and the heat is communicated to the mica plate $e$, which is thereby sufficiently heated to light a cigar pressed against it through the mouthpiece C.

If the current used for ordinary incandescent lamps is employed, a resistance-coil $k$ may be inserted in the electric circuit and the current thereby regulated.

It will be noted that the outer mica plate $e$ performs a double function, serving to protect the loops in the coil from abrasion or displacement to which they would be liable if the cigar were pressed directly against them and also serving to transmit the heat of the coil to the cigar, while at the same time the mica being a non-conductor of electricity the insulation of the wire coils from each other is preserved.

I am aware that a coil of electric wire embedded in a plastic mixture of fire-clay and glass, which is afterward vitrified by the application of heat, has been employed in an electric cigar-lighter, and therefore do not claim, broadly, the covering of such wires with a non-conducting substance.

What I claim, and desire to secure by Letters Patent, is—

1. In an electric cigar-lighter a flattened coil of fine platinum wire wound spirally around a thin plate of mica or other electrically non-conducting material, in combination with an igniting-plate consisting of a thin plate of mica in contact with the outer flattened side of said coil but disconnected therefrom and means for transmitting an electric current through said wire substantially as described.

2. In an electric cigar-lighter a flattened coil of fine platinum wire wound spirally around a thin plate of mica or other electrically non-conducting material, in combination with an igniting-plate consisting of a thin plate of mica in contact with the outer side of said coil but disconnected therefrom, and a back plate of mica also in contact with said coil and resting upon a surface of plaster-of-paris or other non-conducting material, the two plates inclosing said coil, and means for transmitting a current of electricity through said coil substantially as described.

In testimony whereof I have signed my name to this specification in the presence of two subscribing witnesses.

ALFRED B. KITTSON.

Witnesses:
W. L. WILLIAMS,
CHAS. M. REED.